United States Patent
Feng et al.

(10) Patent No.: US 9,412,040 B2
(45) Date of Patent: Aug. 9, 2016

(54) METHOD FOR EXTRACTING PLANES FROM 3D POINT CLOUD SENSOR DATA

(71) Applicant: Mitsubishi Electric Research Laboratories, Inc., Cambridge, MA (US)

(72) Inventors: Chen Feng, Ann Arbor, MI (US); Yuichi Taguchi, Arlington, MA (US); Vineet Kamat, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 190 days.

(21) Appl. No.: 14/096,378

(22) Filed: Dec. 4, 2013

(65) Prior Publication Data
US 2015/0154467 A1  Jun. 4, 2015

(51) Int. Cl.
  *G06K 9/46* (2006.01)
  *G06K 9/48* (2006.01)
  *G06K 9/00* (2006.01)
  *G06T 7/00* (2006.01)

(52) U.S. Cl.
  CPC .............. *G06K 9/48* (2013.01); *G06K 9/00664* (2013.01); *G06K 9/469* (2013.01); *G06K 9/4638* (2013.01); *G06T 7/0083* (2013.01); *G06T 2207/10028* (2013.01); *G06T 2207/20141* (2013.01)

(58) Field of Classification Search
  None
  See application file for complete search history.

(56) References Cited

U.S. PATENT DOCUMENTS

| | | | | |
|---|---|---|---|---|
| 5,961,571 A | * | 10/1999 | Gorr | G01S 3/783 340/988 |
| 5,978,504 A | * | 11/1999 | Leger | G06K 9/00201 356/613 |
| 6,650,779 B2 | * | 11/2003 | Vachtesvanos | G01N 21/956 348/88 |
| 7,129,942 B2 | * | 10/2006 | Martin | G06T 17/20 345/423 |
| 7,643,966 B2 | * | 1/2010 | Adachi | G06T 17/00 345/419 |
| 8,004,517 B1 | * | 8/2011 | Edelsbrunner | G06T 17/20 345/419 |
| 8,005,767 B1 | * | 8/2011 | Cassella | G06K 9/6221 706/12 |
| 8,144,921 B2 | * | 3/2012 | Ke et al. | 382/100 |
| 8,199,977 B2 | * | 6/2012 | Krishnaswamy | G06K 9/00201 345/589 |
| 8,243,988 B1 | * | 8/2012 | Buddemeier | G06F 17/30551 382/103 |
| 8,289,321 B2 | * | 10/2012 | Gutmann | B62D 57/024 345/419 |

(Continued)

OTHER PUBLICATIONS

Boykov et al—An experimental comparison of min-cut max-flow algorithms for energy minimization in vision—Sep. 2004—IEEE trascation on PAMI vol. 26-9—pp. 1124-1137.*

(Continued)

*Primary Examiner* — Chan Park
*Assistant Examiner* — Iman K Kholdebarin
(74) *Attorney, Agent, or Firm* — Gene Vinokur; Hironori Tsukamoto; James McAleenan (57) ABSTRACT

A method extracts planes from three-dimensional (3D) points by first partitioning the 3D points into disjoint regions. A graph of nodes and edges is then constructed, wherein the nodes represent the regions and the edges represent neighborhood relationships of the regions. Finally, agglomerative hierarchical clustering is applied to the graph to merge regions belonging to the same plane.

19 Claims, 7 Drawing Sheets

(56) References Cited

U.S. PATENT DOCUMENTS

| | | | | |
|---|---|---|---|---|
| 8,340,400 | B2* | 12/2012 | Lukas | G06K 9/00201 382/154 |
| 8,355,552 | B2* | 1/2013 | Schwartz | G06K 9/34 382/131 |
| 8,660,365 | B2* | 2/2014 | Lukas | G06T 17/20 382/103 |
| 2002/0059042 | A1* | 5/2002 | Kacyra | G01B 11/002 702/152 |
| 2003/0038802 | A1* | 2/2003 | Johnson | G06T 17/30 345/420 |
| 2004/0108999 | A1* | 6/2004 | Martin | G06T 17/20 345/423 |
| 2005/0166413 | A1* | 8/2005 | Crampton | B25J 13/088 33/503 |
| 2006/0034545 | A1* | 2/2006 | Mattes | G06T 7/0028 382/294 |
| 2006/0052943 | A1* | 3/2006 | Ramani | G06F 19/28 702/19 |
| 2006/0182327 | A1* | 8/2006 | Mundy | C07D 401/14 382/132 |
| 2006/0269144 | A1* | 11/2006 | Kubota | G06K 9/622 382/225 |
| 2007/0031064 | A1* | 2/2007 | Zhao | G06K 9/00214 382/285 |
| 2007/0052706 | A1* | 3/2007 | Martin | G06T 17/20 345/423 |
| 2007/0070226 | A1* | 3/2007 | Matusik | H04N 5/272 348/275 |
| 2008/0130978 | A1* | 6/2008 | Neemuchwala | G06K 9/342 382/132 |
| 2008/0294332 | A1* | 11/2008 | Levanon | G01C 21/3638 701/532 |
| 2009/0016564 | A1* | 1/2009 | Ke | G06K 9/00463 382/100 |
| 2009/0226060 | A1* | 9/2009 | Gering | G06T 7/0081 382/128 |
| 2009/0268214 | A1* | 10/2009 | Lucic | G01B 11/25 356/614 |
| 2010/0027892 | A1* | 2/2010 | Guan | G06K 9/00355 382/203 |
| 2010/0092075 | A1* | 4/2010 | Lee | G06K 9/38 382/159 |
| 2010/0207936 | A1* | 8/2010 | Minear | G06T 7/0024 345/419 |
| 2010/0277571 | A1* | 11/2010 | Xu | G06T 7/0057 348/47 |
| 2010/0316257 | A1* | 12/2010 | Xu | G06K 9/00771 382/103 |
| 2011/0054783 | A1* | 3/2011 | Kishikawa | G01C 21/3632 701/533 |
| 2011/0134225 | A1* | 6/2011 | Saint-Pierre | G01B 11/03 348/47 |
| 2011/0274343 | A1* | 11/2011 | Krishnaswamy | G06K 9/00201 382/154 |
| 2011/0310088 | A1* | 12/2011 | Adabala | G06T 19/003 345/419 |
| 2013/0011069 | A1* | 1/2013 | Quan | G06K 9/00704 382/190 |
| 2013/0156262 | A1* | 6/2013 | Taguchi | G06T 7/0046 382/103 |
| 2013/0166255 | A1* | 6/2013 | Chang | G06T 7/0006 703/1 |
| 2013/0208098 | A1* | 8/2013 | Pujol Alcolado | G06T 7/0075 348/47 |
| 2013/0282208 | A1* | 10/2013 | Mendez-Rodriguez | G01S 17/89 701/16 |
| 2014/0003705 | A1* | 1/2014 | Taguchi | G06T 7/0032 382/154 |
| 2014/0072213 | A1* | 3/2014 | Paiton | G06K 9/4619 382/165 |
| 2014/0093160 | A1* | 4/2014 | Porikli | G06T 7/208 382/159 |
| 2014/0193076 | A1* | 7/2014 | Gardiner | G06K 9/46 382/190 |
| 2014/0254941 | A1* | 9/2014 | Schwartz | G06K 9/00436 382/202 |
| 2015/0117708 | A1* | 4/2015 | Guigues | G06T 7/0042 382/103 |
| 2015/0127650 | A1* | 5/2015 | Carlsson | G06F 17/30663 707/737 |

OTHER PUBLICATIONS

Boykov et al—An experimental comparison of min-cut max-flow algorithms for energy minimization in vision—Sep. 2004—IEEE trascation on PAMI vol. 26-9-ppl 124-1137.*

McKinnon, et al. Masters thesis: Point—line segment and region based stero matching for mobile robotics—Master of science thesis—Aug. 2009.*

R. Schnabel, R. Wahl, and R. Klein, "Efficient RANSAC for point cloud shape detection," Computer Graphics Forum, vol. 26, No. 2, pp. 214-226, Jun. 2007.

J. Poppinga, N. Vaskevicius, A. Birk, and K. Pathak, "Fast plane detection and polygonalization in noisy 3D range images," in Proc. IEEE/RSJ Int'l Conf. Intelligent Robots and Systems (IROS), 2008, pp. 3378-3383.

K. Georgiev, R. T. Creed, and R. Lakaemper, "Fast plane extraction in 3D range data based on line segments," in Proc. IEEE/RSJ Int'l Conf. Intelligent Robots and Systems (IROS), 2011, pp. 3808-3815.

* cited by examiner

METHOD FOR EXTRACTING PLANES FROM 3D POINT CLOUD SENSOR DATA

FIELD OF THE INVENTION

This invention relates generally to processing three-dimensional (3D) data, and more particularly to extracting planar features from 3D sensor data.

BACKGROUND OF THE INVENTION

Low-cost depth cameras and 3D sensors, such as Microsoft Kinect®, can be used in robotics and computer vision applications. Typically, the sensors acquire a set of 3D points, i.e., a 3D point cloud, of a scene. Those 3D point clouds are generally noisy and redundant, and do not characterize high-level semantics in the scene.

Typically, primitive are extracted from the 3D point clouds to model the scene compactly and semantically. In particular, planes are one of the most important primitives because many man-made structures have planar surfaces.

Plane Extraction

A typical, method used for extracting planes from a point cloud is based on RANdom SAmple Consenus (RANSAC). That method first hypothesizes several candidates of planes, each of which is generated by randomly sampling three points from the point cloud and determining a set of points (referred to as inliers) that are on the plane defined by the three points. That method then selects from the candidates an optimal plane that is supported by the largest number of inliers. After removing the inliers from the point cloud, that method iterates the process to extract multiple planes. Because that method requires a relatively long time, several variants are known, e.g., Hough transformation and connected component analysis can be applied to the point cloud for pre-segmentation and then RANSAC can be applied to each of the segments. RANSAC can also be applied to local regions of the point cloud, followed by finding connected points on the plane from each of the local regions, called region growing.

A similar but much slower variant is voxel growing. Regions can also be grown from line segments extracted from individual scan lines. Another method clusters the points in a normal space and further clusters according to distances to an origin. To avoid normal estimation per point, graph-based segmentation using a self-adaptive threshold can be used.

Applications Using Planes

Planes extracted in this manner are used in various applications, such as robotics, computer vision, augmented reality, and 3D modeling. Compact and semantic modeling of scenes provided by planes is useful in indoor and outdoor 3D reconstruction, visualization, and building information modeling. Extracting major planes is a common strategy for table-top manipulation using robots, because planes help to segment objects placed on the planar table top. Planes have also been used for simultaneous localization and mapping (SLAM) and place recognition systems, where planes can be used as landmarks of the scene.

Although features in the form of planes are generally more accurate than point features, at least three planes whose normals span a 3D space are required to determine a 6-degrees-of-freedom (DoF) camera pose in such SLAM and place recognition systems. To avoid the degeneracy due to the insufficient number of planes, points and planes can be used together as landmarks.

SUMMARY OF THE INVENTION

Embodiments of the invention provide a method for concurrently extracting multiple planes from a 3D point cloud in real time. Our method can be classified as a region-growing-based method, to contrast with the prior methods, which generally use points or lines as primitives in region growing, our method uses regions as primitives.

Point clouds can be classified into organized point clouds and unorganized point clouds, in organized point clouds, the neighborhood relationship between 3D points is known, for example, because the points are generated from a depth map where we can define a 2D grid describing the neighborhood relationship. In unorganized point clouds, on the other hand, the neighborhood relationship is unknown, i.e., points are stored in a random order.

In one embodiment, a region is a small 2D patch of a depth map, from which an organized point cloud is generated. In this case, the 3D points are first partitioned into a set of disjoint regions according to the 2D grid structure defined on the depth map. A graph is defined, where regions correspond to nodes in the graph and the neighborhood relationship between regions correspond to edges in the graph. Uniform or non-uniform partitioning of the 2D grid structure is possible.

In another embodiment, a region is a voxel in a 3D space, in which an unorganized point cloud is defined. In this case, the 3D space is partitioned into a set of disjoint voxels, and each of the 3D points are assigned to a voxel according to the position of the point. Voxels including at least one 3D point are defined as nodes in a graph. Then edges in the graph are defined if two voxels are next to each other in the 3D space. Uniform or non-uniform partitioning of the 3D space possible.

After the graph is defined, agglomerative hierarchical clustering (AHC) is applied to the graph. AHC constructs a hierarchy of clusters in a "bottom-up" manner. That is, each node is defined as a cluster at the beginning, and then pairs of clusters are merged as one moves up the hierarchy. Each cluster includes a set of 3D points, to which a plane is fitted and the mean squared error (MSE) of the 3D points from the fitted plane is determined. The clustering systematically merges neighboring clusters in the graph such that the merged cluster has the minimum MSE. The clustering is repeated until no merge can produce the MSE that is smaller than a predefined threshold.

The boundaries of the planes generated by the clustering are coarse, because the planes are represented by a set of regions. If needed, the boundaries of the planes can be refined via region growing by using individual 3D points as primitives. We refer to planes after the clustering that have coarse boundaries as coarse planes, and planes after the refining that have fine boundaries as fine planes.

The method can extract planes at an effective frame rate of 30 Hz or higher for organized point clouds with 640×480 points, which is considerably faster than prior art methods, and enables real time applications.

DETAILED DESCRIPTION OF THE PREFERRED EMBODIMENT

Figure 1:
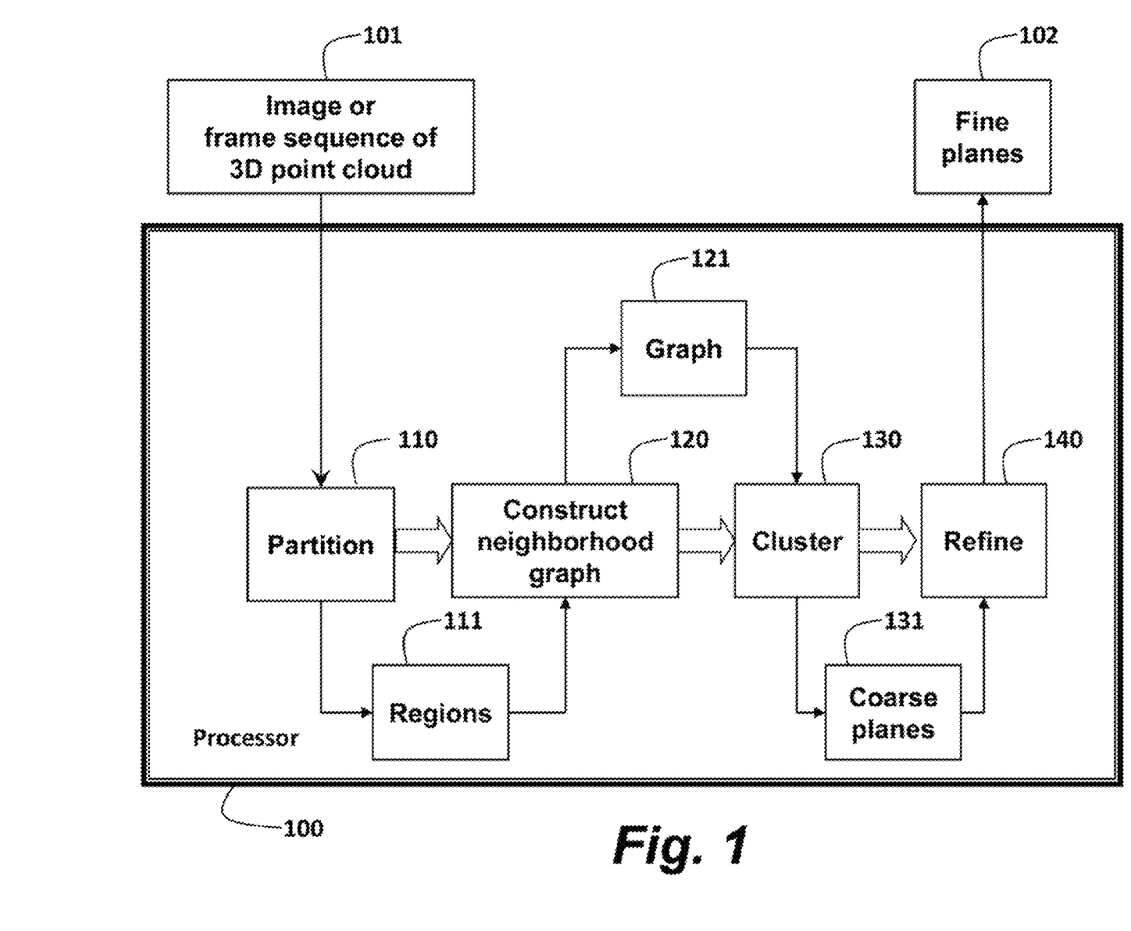
FIG. 1 is a flow diagram a method for extracting planes from a 3D point cloud according to embodiment of the invention.

As shown in FIG. 1, the embodiments of the invention provide a method for concurrently extracting multiple planes 102 from a 3D point cloud 101 in real time. The data are acquired as an image, or a sequence of frames for real time continues operation, by a 3D sensor. Each image or frame is processed in turn.

The point cloud is partitioned 110 into a set of disjoint regions 111. A selected size for the regions can vary depending on the application need, e.g., in the range of about 10 to 1000 points per region.

A graph 121 of nodes and edges is constructed 120 for the regions. The nodes represent the regions and the edges represent spatial relationships of the regions; regions that are next to each other are connected by an edge. Agglomerative hierarchical clustering (AHC) 130 is applied to the graph. At the beginning, each node is a cluster, and then pairs of clusters are merged systematically. Clusters of nodes after the clustering correspond to coarse planes 131. The coarse planes can be refined 140 using point-based region growing to obtain the fine planes 102.

The steps of the method can be performed in a processor 100 connected to memory and input/output interfaces by busses as known in the art.

Method Overview

FIGS. 2-5 show how the acquired data of a scene are processed schematically. Here we explain the method using an organized point cloud generated from a depth map. A depth map has a 2D grid of pixels, and each pixel has a distance value. An organized point cloud is generated by back-projecting the pixels to the 3D space according to the internal camera parameters (e.g., focal length and principal point) and determining 3D points using the distance values. The Figs. represent the scene overlayed on the 2D grid of the depth map. As can be see in the Figs., the scene includes a work table near stairs, and a basket under the table.

Figure 2:
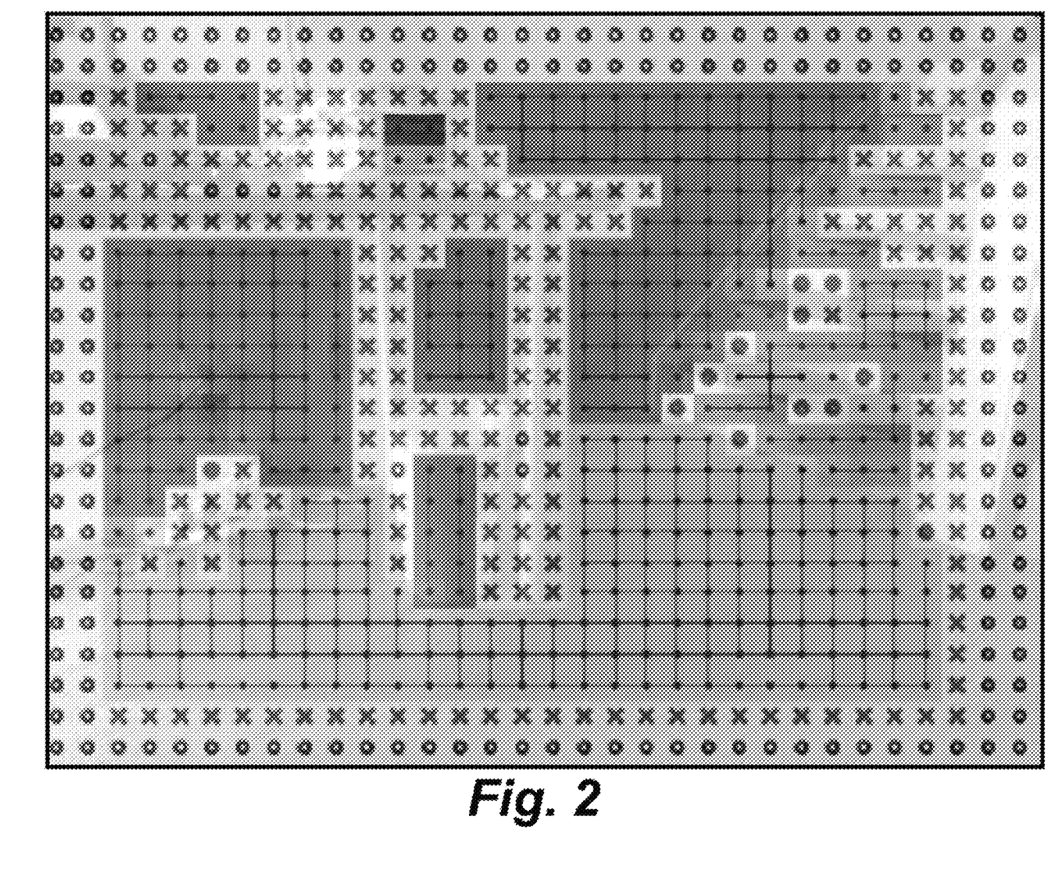
FIG. 2 is a schematic of initializing a graph according to embodiment of the invention.

FIG. 2 shows the initialization of the graph. This point cloud is generated by a depth map having 640×480 pixels. The point cloud is partitioned uniformly into, e.g., 20×20 pixel regions. The intensity of each region generally corresponds to the normal of the plane fitted in the region. Regions with similar intensities probably correspond to the same plane. Black dots connected by lines represent the nodes and edges in the graph. Regions marked by 'x', 'o' and ● represent regions rejected at depth discontinuities, missing data, and excessive plane fitting MSE, respectively; these regions are not included in the graph.

Figure 3:
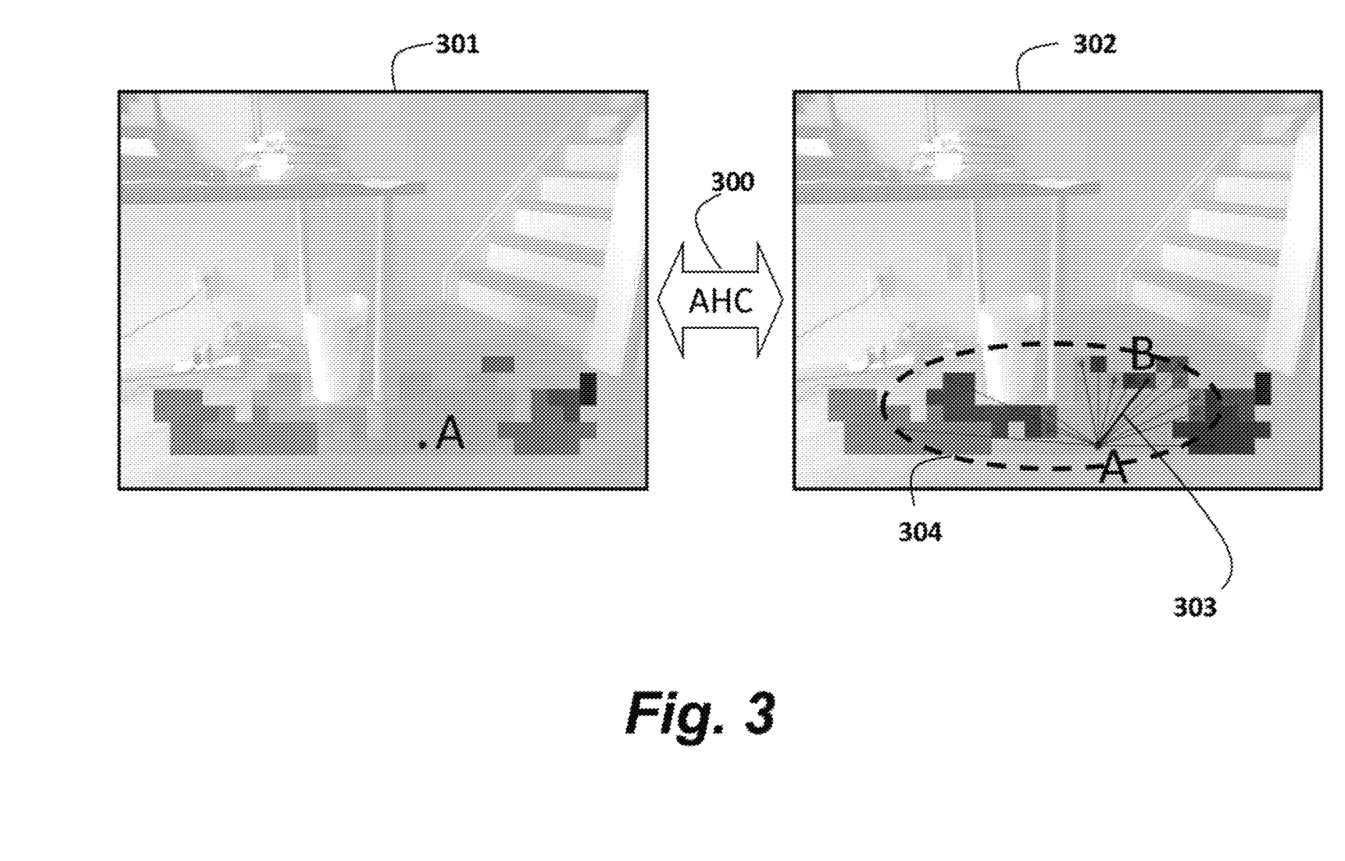
FIG. 3 is a schematic of agglomerative hierarchical clustering according to embodiment of the invention.
Figure 4:
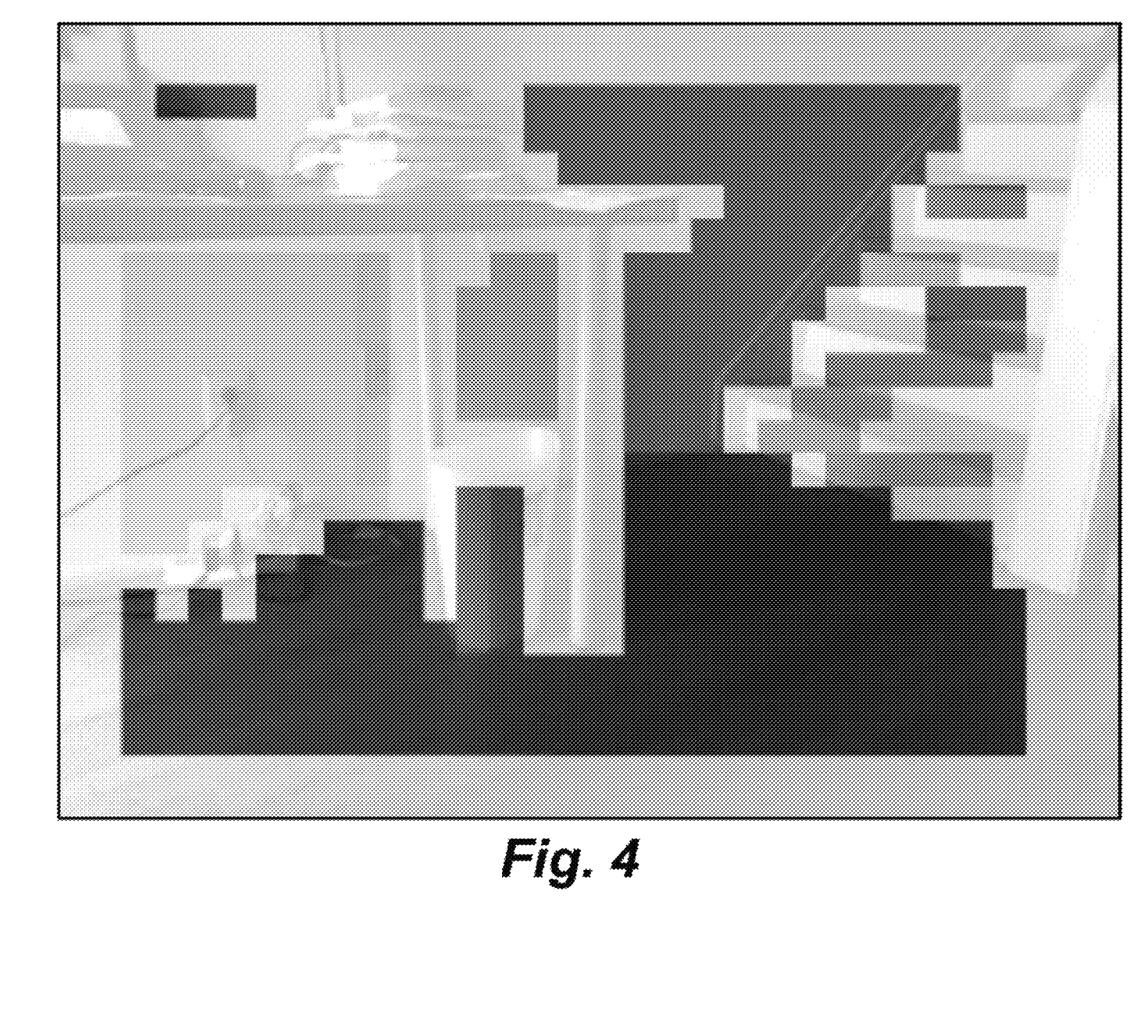
FIG. 4 is a schematic of coarse planes extracted according to embodiment of the invention.
Figure 5:
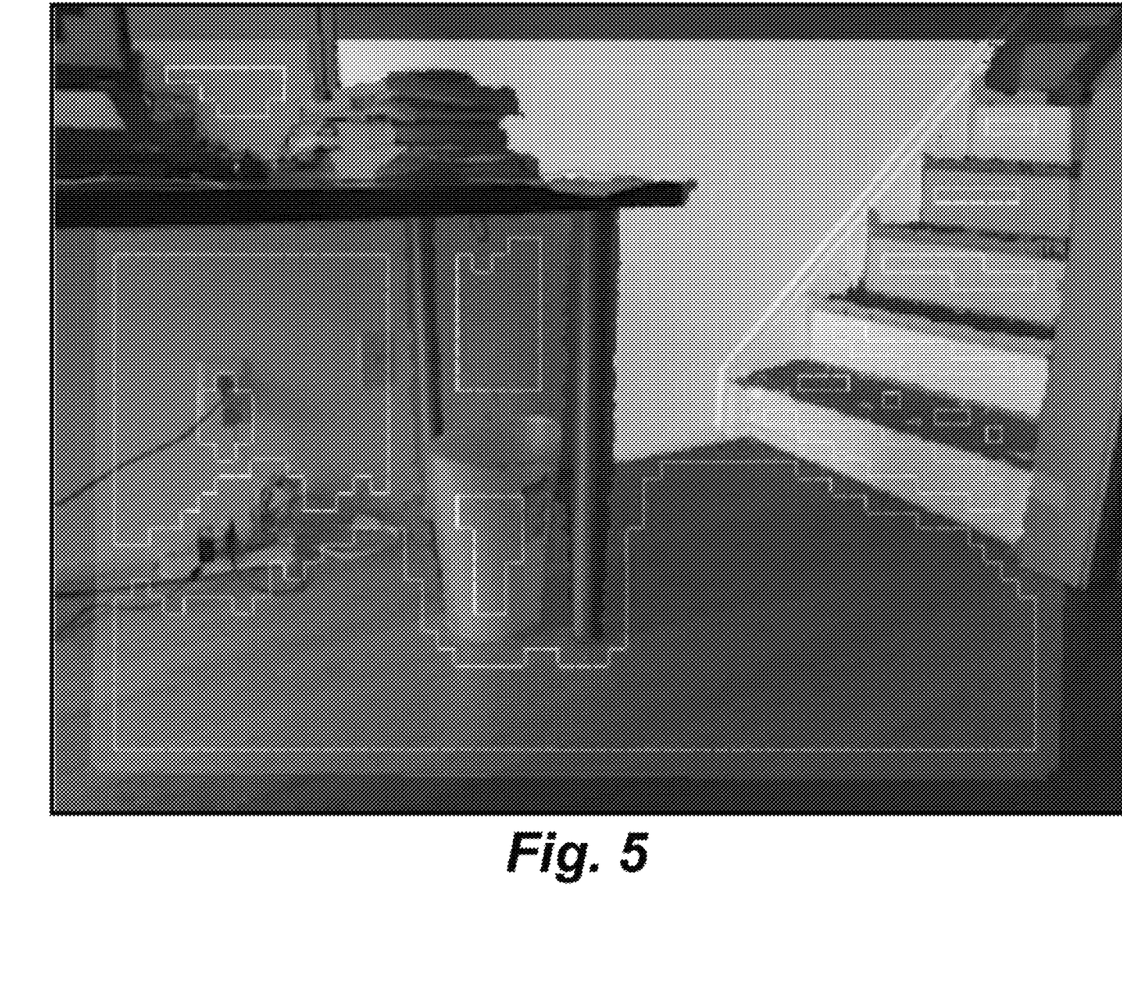
FIG. 5 is a schematic of fine planes extracted according to embodiment of the invention.

FIG. 3 shows the iterative AHC 300 where a duster A with a minimum MSE is located 301 and merged 302. The black lines, generally in area 304, show all edges coming out from the cluster A, and the thick black line 303 shows the edge from the cluster A to the cluster B, which gives the minimum plane fitting MSE when merging the cluster A with a neighboring cluster. FIGS. 4-5 show the coarse and fine planes, respectively.

We define an organized point cloud to be a set of 2D indexed 3D points $p_{i,j}$, here 2D indices (i, j) and (i±1, j±1) reflect a 3D proximity relationship between points $p_{i,j}$ and $p_{i\pm1,j\pm1}$ when the points are on the same surface. This index space can be called the image space, usually obtained from a depth map produced by devices such as a time-of-flight camera, structural light scanning system, or even rotating a scanning plane of a laser range finder.

2D Line Segment Extraction

We first describe our method using an example of extracting 2D line segments from a set of 2D points. Later, we extend our description to extracting planes in the 3D space from a set of 3D points.

Figure 6:
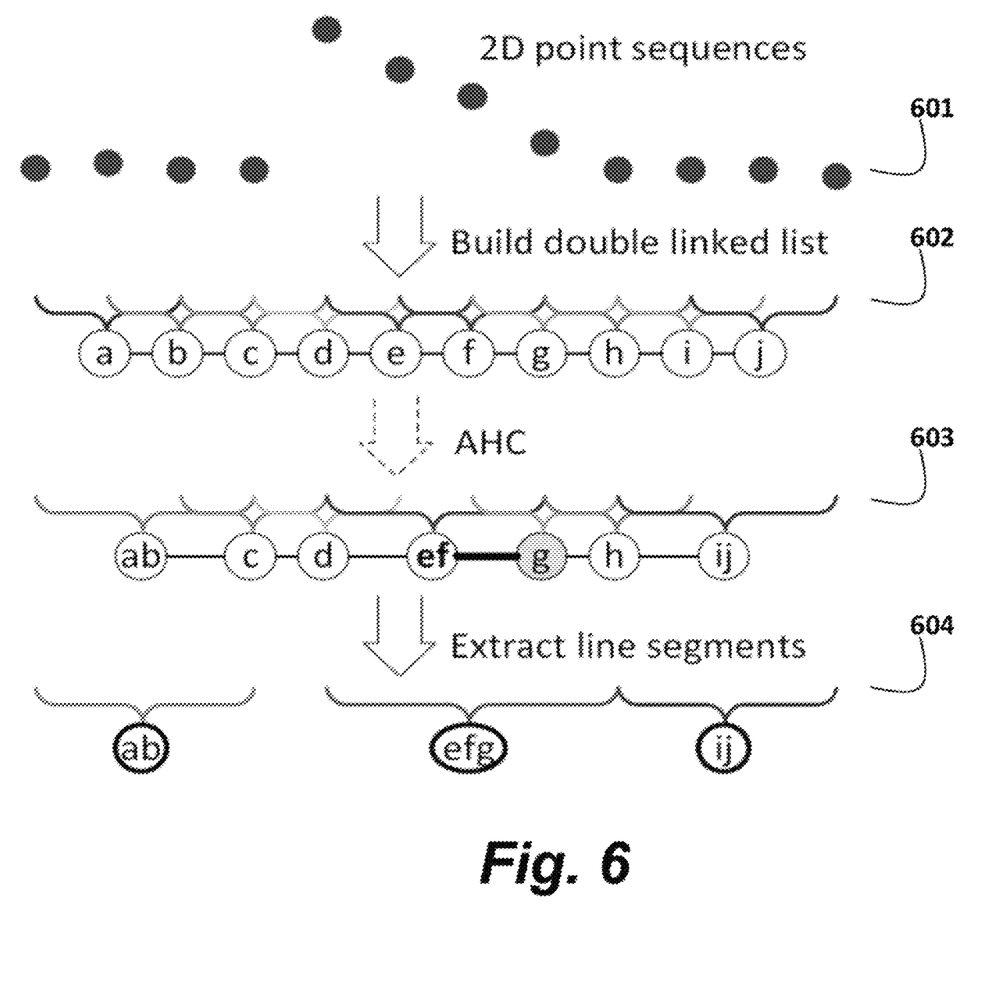
FIG. 6 is a schematic of extracting line segments according to embodiment of the invention.

As shown in FIG. 6, we extract line features from a set of 2D points 601 output from a 3D sensor. Here the set of 2D points is organized, i.e., the neighborhood relationship is known; thus the set is given as a sequence of 2D points. The dots represent 2D points in the sequence. Circles labeled with letters and their corresponding brackets show the clusters in a double linked list 602.

As shown in FIG. 6, every W consecutive points (e.g., W=3) in the sequence are initially grouped as a node. The nodes are stored into the double linked list 602 according to the neighborhood relationship. We use "node" and "cluster" interchangeably to represent a set of data points. Then, the AHC is performed on this linked list by iterating the following steps:

(a) finding the node with the minimum line fitting MSE; and (b) merging this node with either its left or right neighbor that gives the minimum line fitting MSE.

For example, in one of the iterations of the AHC shown 603, the node g is found that has the minimum line fitting MSE. The thick line indicates that merging the node g with its left neighbor ef gives a smaller line fitting MSE than merging with its right neighbor thus the node g is merged with the node ef, producing the node efg 604.

If the minimal merging MSE is larger than a predefined threshold, which can usually be decided by the noise characteristics of the sensor, then the merging is canceled and the node g can be extracted as a line segment. Merging two nodes and calculating the resulting line fitting MSE can be done as a constant time operation using an integral image. Integral images are described in, e.g., U.S. Pat. No. 7,020,337.

Differences When Generalizing to Plane Extraction from 3D Point Clouds

Realizing the significance of neighborhood information hidden in the order of the points in the sequence, we generalize from 2D line extraction to 3D plane extraction in an organized point cloud, where the neighborhood information is stored in the 2D indices. However, this generalization is nontrivial, and not at all obvious. There are two major differences in the 3D case not found in the 2D line extraction:

Node Initialization: As opposed to the fine segment extraction, initial nodes, and thus any two nodes during and after merging, should have no identical points shared among the nodes.

Node Merging: In the line segment extraction, merging a node with its neighbor is a constant time operation with at most two merging attempts, either to left or to right neighbor. In the 3D case, a larger number of merging attempts might be required, because nodes are connected to form a graph and have a varying number of neighbors after the merging steps.

The reason for the first difference is because there are two possible directions for nodes to be merged with each other in the image space of the organized point cloud. After a few merging steps, the 3D points belonging to a certain node $B_s$ form an irregular shape instead of maintaining an initial rectangular shape in the image space. Thus, if different nodes are allowed to have identical points, it is very difficult to efficiently handle the overlapping points when merging two nodes, even with the help of the integral image.

In the line segment extraction, merging two neighboring line segments still result in a line segment represented by a starting and ending index in the point sequence, which makes overlapping nodes feasible. It is important to notice that the overlapping nodes enable the line segment extraction to automatically split line segments at their boundaries, because nodes containing points at different line segments tend to have larger line fitting MSE than others, nodes c, d and h in FIG. 6, so that their merging attempts are first delayed and finally rejected.

The second difference, i.e., the varying number of neighbors of a node, increases the number of merging attempts to find the minimum merging USE. However, we empirically found that the average number of merging, attempts stays at a small number and thus the clustering can be performed efficiently.

Fast Plane Extraction Method

Our plane extraction method includes the following main steps: 1) graph initialization; 2) agglomerative hierarchical clustering (AHC); and 3) boundary refinement, if the application only requires rough segmentation of planar regions, e.g., the application requires the normals of planes but not their boundary information, then the boundary refinement step can be omitted, which can increase the processing frame rate to more than 50 Hz.

Graph Initialization

As described before, our method generates disjoint regions and non-overlapping nodes during initialization. Let us consider the scene shown in FIG. 7. Here the 3D points defined in the image space are uniformly partitioned into rectangular regions 701. Regions without having any marks ate initial nodes, which form the graph. On the other hand, regions with some marks are discarded by the following reasons: 'o' represent a region with missing data, 'x' represents a region with depth discontinuity, a black dot represents a region with a too large plane fitting MSE, and 'B' represents a region located at the boundary region between two connected planes.

Figure 7:
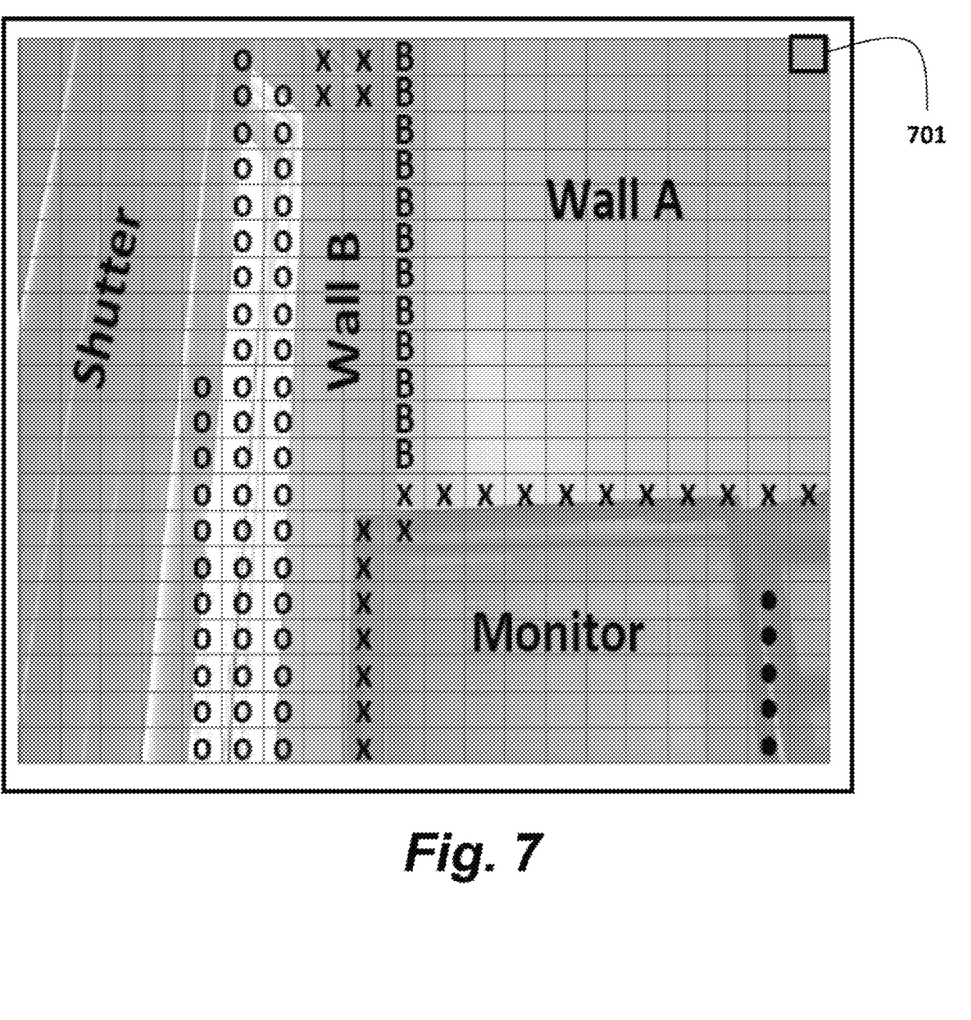
FIG. 7 is a schematic of an example graph initialization according to embodiment of the invention.

Because of inherent limitations in 3D sensors, some regions of the scene cannot he sensed, leading to missing data, e.g., a glass window next to a window shutter. The regions containing missing data points should not be considered. Also, some regions can have a very large plane fitting MSE, which is usually because the region violates the planarity assumption, and thus should not be considered.

Two other difficult scenarios are regions including depth discontinuities and regions at a boundary between two planes. In the former ease, a region contains two sets of points lying on two surfaces that do not connect in 3D but are close to each other in the image space because of the view direction, usually one surface partially occlude the other, e.g., a monitor occludes the wall A behind the monitor.

If principle component analysis (PCA) is performed on points belonging to this region for plane fitting, then the fitted plane is nearly parallel to the view direction and still has a small MSE. Merging this "outlier" region with its neighbor will have the bad effect on the plane fitting result because of the well-known issue of over-weighting outlier in least-squares methods. In the latter case, a boundary region contains points close to each other in 3D but lie on two difference surfaces e.g., the corner of the room, which decreases the plane fitting accuracy after merged. Thus, we discard such regions.

Agglomerative Hierarchical Clustering

Instead of operating on a double linked list as in the case of line extraction shown in FIG. 6, our AHC operates on the graph. We determine a node v that currently has the minimum plane fining MSE among all nodes in the graph and try to merge with one of its neighbor nodes, $u_{best}$, that gives the minimal merging MSE. Recall that each node in the graph represents a region that is a set of points, so the merging MSE is the plane fitting MSE of the union of the two set $u_{merge}$.

If this minimum merging MSE exceeds some predefined threshold $T_{MSE}$, then a plane segment v is found and extracted from the graph. Otherwise, the merged node $u_{merge}$ is added back to the graph by edge contraction between v and $u_{best}$.

Implementation Details

Several implementation details improve the speed and accuracy for the coarse plane extraction:

1. A disjoint set data structure is used for tracking the membership of each node $v_{i,j}$.
2. A min-heap data structure is used for efficiently finding a node with the minimum plane fitting MSE. A min-heap is a complete binary tree such that the data contained in each node is less than or equal to the data in that node's children.
3. All nodes maintain the first and second order statistics of all points in the represented region, i.e.,
$\Sigma x_{i,j}, \Sigma y_{i,j}, \Sigma z_{i,j}, \Sigma x_{i,j}^2, \Sigma y_{i,j}^2, \Sigma z_{i,j}^2,$
$\Sigma x_{i,j} y_{i,j}, \Sigma y_{i,j} z_{i,j}, \Sigma z_{i,j} x_{i,j},$
such that merging two nodes and calculating its plane equation and MSE through PCA is a constant time operation.
4. The depth discontinuity predicate to reject nodes and the threshold TMSE for extracting segments depend on sensor noise characteristics.

Boundary Refinement

For many applications, coarse planes may be insufficient because of artifacts such as sawtooth edges at plane boundaries, unused data points at boundaries of occlusions, and oversegmentation.

Such artifacts can be reduced by erosion of boundary regions followed b region growing using individual points as primitives. The region growing starts from all new boundary points to assign all unused data points to the closest plane that was extracted previously.

Applications

Planes extracted by our method can be used in many applications. Planes can be used for registering a set of 3D point clouds defined in different coordinate systems. The registration can be done when there are three or more planes whose normals span a 3D space; otherwise, the 3D points can be used in conjunction with planes for the registration.

Planes are less affected by noises of 3D sensor measurements than individual points. Thus, by using planes, we can determine more precise coordinates of 3D locations than using the original 3D points in a 3D point cloud.

For example, after the planes are fitted to the point cloud shown in FIG. 7, the 3D coordinates of the corners of the monitor can be extracted. The coordinates of a 3D location can be automatically determined as a boundary point of a plane, or as a feature point of some shape fitted to the boundary points of the plane (e.g., the center of a circle fitted to the boundary points). The 3D coordinates can also be specified manually by selecting a pixel location in the depth map, from which the 3D coordinates are determined by back-projecting the pixel onto the plane.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for extracting planes from three-dimensional (3D) points, comprising the steps of:
    acquiring a depth map with a 3D sensor, wherein the depth map has a two-dimensional grid of pixels and each pixel has a depth value;
    back-projecting the depth map to generate a cloud of 3D points;
    partitioning the 3D points into disjoint regions;
    constructing a graph of nodes and edges, wherein the nodes represent the regions and the edges represent neighborhood relationships of the regions, wherein each node includes a set of 3D points, a plane fitted to the set of 3D points, and a mean squared error (MSE) of the set of 3D points to the plane; and
    applying agglomerative hierarchical clustering to the graph to merge regions belonging to a same plane, wherein in each iteration of the agglomerative hierarchical clustering, a node with a minimum MSE is selected and merged with one of neighboring nodes having a minimum merging MSE among the neighboring nodes, wherein the steps are performed in a processor.

2. The method of claim 1, wherein the 3D points are acquired by a 3D sensor.

3. The method of claim 1, further comprising: applying region growing to refine boundaries of the planes.

4. The method of claim 1, wherein planes are extracted from a sequence of images in real time.

5. The method of claim 1, wherein the partitioning is uniform, and the regions are equal sized.

6. The method of claim 1, wherein the 3D points are organized and have 2D indices.

7. The method of claim 6, wherein the 2D indices are used for the partitioning and for the constructing.

8. The method of claim 1, further comprising: maintaining first and second order statistics of all points in each region.

9. The method of claim 1, wherein the 3D points are unorganized.

10. The method of claim 9, further comprising: defining a set of voxels in a 3D space; assigning each 3D point to a voxel according to coordinates of the 3D point; determining voxels that have at least one 3D point as the nodes; and defining the edges between voxels if two voxels are next to each other in the 3D space.

11. The method of claim 1, wherein the partitioning is non-uniform.

12. The method of claim 1, further comprising: registering sets of 3D points defined in different coordinate systems by using the planes extracted from each set of 3D points.

13. The method of claim 12, wherein the registering uses the 3D points and the planes.

14. The method of claim 1, wherein the planes are used for determining coordinates of a 3D location.

15. The method of claim 14, wherein the 3D location is specified manually.

16. The method of claim 14, wherein the 3D location is determined automatically.

17. An image processing system for extracting planes from 3D points, the image processing system comprising:
    a three-dimensional (3D) sensor configured to acquire a depth map, wherein the depth map has a two-dimensional grid of pixels, and wherein each pixel has a depth value;
    a processor operatively connected to the 3D sensor to receive the depth map, wherein the processor is configured for
    back-projecting the depth map to generate a cloud of 3D points;
    partitioning the 3D points into disjoint regions;
    constructing a graph of nodes and edges, wherein the nodes represent the regions and the edges represent neighborhood relationships of the regions, wherein each node includes a set of 3D points, a plane fitted to the set of 3D points, and a mean squared error (MSE) of the set of 3D points to the plane; and
    applying agglomerative hierarchical clustering to the graph to merge regions belonging to a same plane, wherein in each iteration of the agglomerative hierarchical clustering, a node with a minimum MSE is selected and merged with one of neighboring nodes having a minimum merging MSE among the neighboring nodes.

18. The image processing system of claim 17, wherein the 3D sensor is a one or combination of a depth camera, a time-of-flight camera, a structural light scanner, and a laser range finder.

19. A non-transitory computer readable medium storing a program causing a processor to execute an image process for extracting planes from three-dimensional (3D) points, the image process comprising:
    acquiring a depth map with a 3D sensor, wherein the depth map has a two-dimensional grid of pixels and each pixel has a depth value;
    back-projecting the depth map to generate a cloud of 3D points;
    partitioning the 3D points into disjoint regions;
    constructing a graph of nodes and edges, wherein the nodes represent the regions and the edges represent neighborhood relationships of the regions, wherein each node includes a set of 3D points, a plane fitted to the set of 3D points, and a mean squared error (MSE) of the set of 3D points to the plane; and
applying agglomerative hierarchical clustering to the graph to merge regions belonging to a same plane, wherein in each iteration of the agglomerative hierarchical clustering, a node with a minimum MSE is selected and merged with one of neighboring nodes having a minimum merging MSE among the neighboring nodes, wherein the steps are performed in a processor.

* * * * *